United States Patent

Serini et al.

[11] 3,879,348
[45] Apr. 22, 1975

[54] SAPONIFICATION-RESISTANT POLYCARBONATES

[75] Inventors: Volker Serini; Hermann Schnell; Hugo Vernaleken, all of Krefeld, Germany

[73] Assignee: Bayer Aktiengesellschaft, Leverkusen, Germany

[22] Filed: Oct. 28, 1973

[21] Appl. No.: 408,884

Related U.S. Application Data

[63] Continuation of Ser. No. 209,420, Dec. 17, 1971, abandoned.

[30] Foreign Application Priority Data

Dec. 22, 1970 Germany............................ 2063050
Dec. 22, 1970 Germany............................ 2063052

[52] U.S. Cl...... 260/47 XA; 117/138.8 A; 260/463; 426/106
[51] Int. Cl............................................ C08g 17/13
[58] Field of Search ................................ 260/47 XA

[56] References Cited
UNITED STATES PATENTS

| 3,173,891 | 3/1965 | Fry et al............................ | 260/47 XA |
| 3,251,805 | 5/1966 | Schnell et al. ................. | 260/47 XA |
| 3,312,659 | 4/1967 | Kurkjy et al. .................. | 260/47 XA |

FOREIGN PATENTS OR APPLICATIONS

| 1,458,719 | 11/1966 | France ............................ | 260/47 XA |

Primary Examiner—Wilbert J. Briggs, Sr.
Attorney, Agent, or Firm—Lawrence S. Pope

[57] ABSTRACT

Polycarbonates are provided which have the repeating structural units:

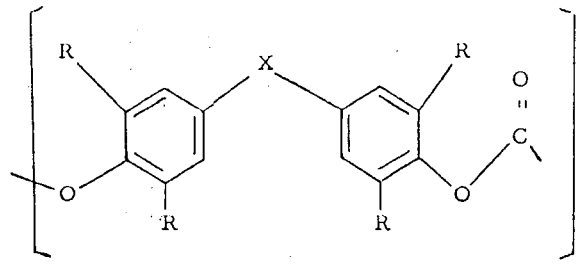

wherein:
R is $CH_3$, $C_2H_5$ or $CH(CH_3)_2$ and
X is a bond, an alkylene or alkylidene group with 1 to 5 carbon atoms, a cyclohexylene or cyclohexylidene radical and an average degree of polymerization of at least 55.

These polycarbonates are prepared by reacting the alkali salt of the corresponding bisphenols with phosgene of the bichlorocarbonic acid esters of the bisphenols or of oligomeric carbonates of the bisphenols and initiating the reaction with from 10 to 200 mol percent based on the bisphenols of an aliphatic tertiary amine and carrying out the reaction for from about 0.1 to about 5 hours.

12 Claims, No Drawings

SAPONIFICATION-RESISTANT POLYCARBONATES

This is a continuation of application Ser. No. 209,420, filed Dec. 17, 1971, and now abandoned.

Polycarbonates from di-hydroxy-di-aryl-alkylidenes possess excellent mechanical, thermal and electrical properties. In contrast to these advantages is the disadvantage of low saponification resistance, above all against alkaline reagents.

Saponification-resistant polycarbonates are, for example, obtained according to German Offenlegungsschrift (German Published Specification) 1,495,642 by replacing the di-hydroxy-diphenyl-alkylidenes usually employed for the manufacture of polycarbonates, at least partially, by bisphenols of the formula

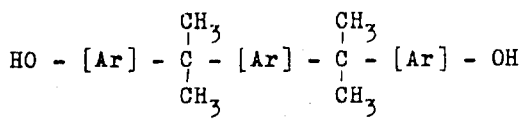

Another possible way of obtaining products of improved hydrolysis resistance is, according to German Offenlegungsschrift (German Published Specification) 1,570,703, to manufacture copolycarbonates into which high proportions of bisphenols of the formula 2

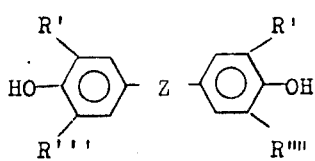

are built; in this formula
Z is an alkylidene radical or a cycloaliphatic radical and
R' to R'''' denote alkyl groups which are identical to, or different from, one another.

These components are built into the copolycarbonates in accordance with the following process: they are reacted in a homogeneous, inert organic phase, in the presence of pyridine or other tertiary amines, such as triethylamine, N,N-dimethylaniline, N,N-diethylaniline or N-methyl-piperidine as acid acceptors, for example with phosgene in the first stage to give bischlorocarbonic acid esters of oligomeric carbonates of 3,3',5,5'-tetraalkyl-substituted 4,4'-bisphenols. These are condensed by a subsequent reaction with 4,4'-bisphenols, which, with the exception of the di-(4-hydroxyphenyl)-sulphones are only incompletely substituted by alkyl groups in the 3,3',5,5'-positions, to give copolycarbonates. Thus this process does not produce high molecular polycarbonates of 3,3',5,5'-tetraalkylated, 4,4'-bisphenols of the formula 6 and hence also does not yield polycarbonates of high resistance to hydrolysis, saponification and aminolysis.

The process of French Pat. 1,561,518 also does not permit a high molecular homopolycarbonate to be obtained from the bis-(3,5-dimethyl-4-hydroxyphenyl)-sulphone employed in this patent.

The subject of present invention on the other hand, are high molecular weight polycarbonates comprising only structural units of the formula 1

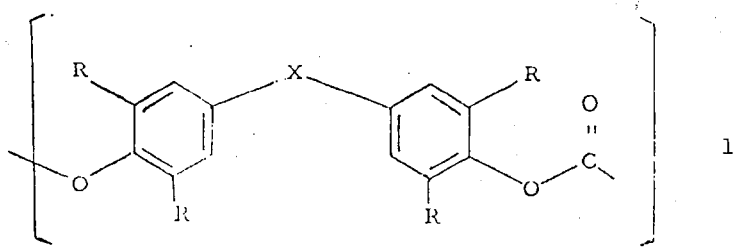

wherein:
R is $CH_3$, $C_2H_5$ or $CH(CH_3)_2$ and
X is a bond, an alkylene or alkylidene group with 1 to 5 carbon atoms, a cycloalkylene or cycloalkylidene radical with 5 to 15 carbon atoms, an ether bond or a keto bond, and/or structural units of the formula 2

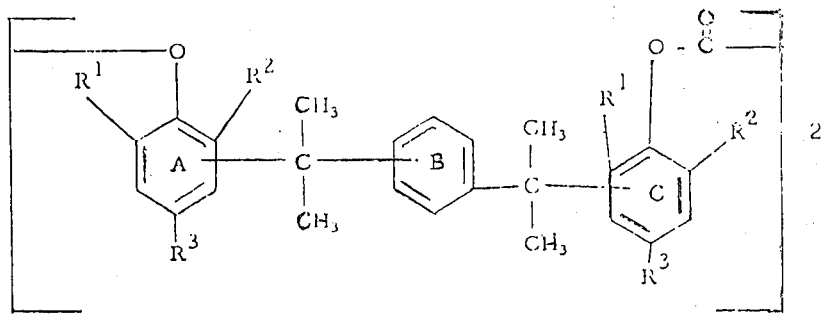

wherein:
$R^1 = CH_3$, $C_2H_5$ or $CH(CH_3)_2$,
$R^2 = CH_3$, $C_2H_5$ or $CH(CH_3)_2$ and
$R^3 = CH_3$, $C_2H_5$ or $CH(CH_3)_2$,
the substituent $R^1$ being absent if the bond of aromatic ring B to aromatic rings A and C is ortho to the carbonate groups in A and C, and the substituent $R^3$ being absent if the bond of aromatic ring B to aromatic rings A and C is para to the carbonate group in A and C, having an average degree of polymerization of at least 30 referring to identical or non identical structural units of the formulae 1 and/or 2.

These polycarbonates are excellent thermoplastics, which hitherto (compare German Offenlegungsschrift (German Published Specification) 1,570,703, page 4, last paragraph and page 5, first paragraph) were not obtainable. As a result of the steric and inductive influence of the alkyl groups these polycarbonates are extremely resistant to saponification, hydrolysis and aminolysis; thus they are, for example, resistant to 10% strength aqueous sodium hydroxide solution, to 10% strength hydrochloric acid and to concentrated aqueous ammonia solution, as can be seen from Tables 1 to 3 and 5 to 7.

According to the invention, these new polycarbonates are obtained by reaction of the bischlorocarbonic acid esters of the corresponding bisphenols or by reaction of the corresponding bisphenols with phosgene or with the bischlorocarbonic acid esters of the bisphenols in accordance with the phase boundary condensation process, in the presence of aqueous alkali and a solvent suitable for the polycarbonates, through the addition of at least 10 mol per cent, relative to bisphenol, of aliphatic tertiary amines, the subsequent reaction time being so chosen that the product of the amount of amine (mol per cent) and the reaction time (hours) exceeds a value of 15 mol per cent amine (related to bisphenols) x hours reaction time.

Hence a further subject of the present invention is a process for the production of high molecular weight polycarbonates comprising only as bifunctional structural units, those of the formula 2

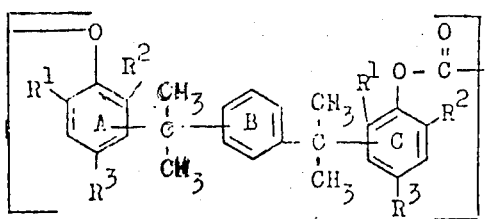
2 wherein:
R$^1$ = CH$_3$, C$_2$H$_5$ or CH(CH$_3$)$_2$,
R$^2$ = CH$_3$, C$_2$H$_5$ or CH(CH$_3$)$_2$ and
R$^3$ = CH$_3$, C$_2$H$_5$ or CH(CH$_3$)$_2$,
the substituent R$^1$ is absent if the bond of the aromatic ring B to the aromatic rings A and C is in the ortho-position in the aromatic rings A and C relative to the carbonate groups in A and C, and the substituent R$^3$ is absent if the bond of the aromatic ring B to the aromatic rings A and C is in the para-position in the aromatic rings A and C relative to the carbonate groups in A and C,
and/or those of the formula 1

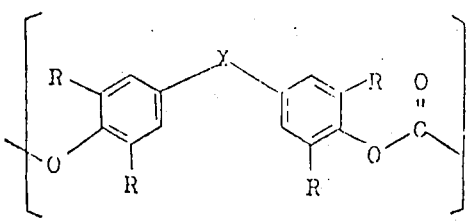
1 wherein:
R = CH$_3$, C$_2$H$_5$ or CH(CH$_3$)$_2$ and
X = a direct bond or denotes an alkylene or alkylidene group with 1–5 carbon atoms, a cycloalkylene or cycloalkylidene radical with 5–15 carbon atoms, another bond or a keto bond,
and which have an average degree of polymerisation $\bar{P}$ of at least 30, relative to identical or non-identical structural units of the formulae 2 and/or 1, which comprises the reaction of (a) alkali metal salts of bisphenols of the formula 4

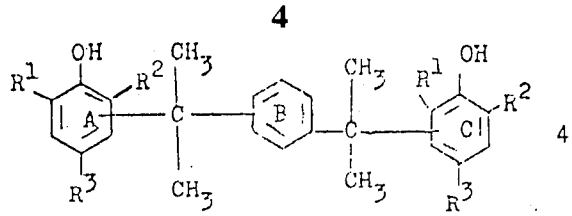
4 wherein R$^1$, R$^2$ and R$^3$ are as defined above and/or bisphenols of the formula 3

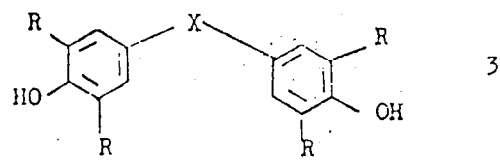
3 wherein R and X are as defined above, with phosgene and/or (b) bischlorocarbonic acid esters of bisphenols of the formulae 4 and/or 3 and/or (C) oligomeric carbonates of bisphenols of the formulae 4 and/or 3 which optionally have chlorocarbonic acid ester end-groups, in a mixture of an aqueous phase and an inert organic solvent, the process being characterised in that the reaction to give high molecular weight polycarbonates is initiated by adding 10–200 mol per cent relative to the bisphenols employed, of aliphatic tertiary amine, and in that a reaction time of from 5 hours to 0.1 hours is observed.

The subject of the invention is especially a process for the production of high molecular weight polycarbonates comprising only as bifunctional structural units those of the formula 1

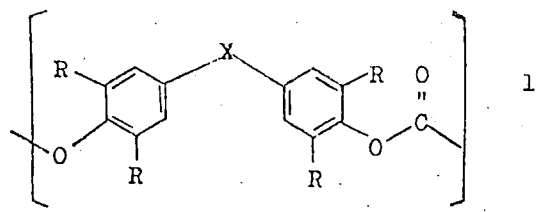
1 wherein:
R = CH$_3$, C$_2$H$_5$ or CH(CH$_3$)$_2$ and
X = a direct bond or denotes an alkylene or alkylidene group with 1–5 carbon atoms, a cycloalkylene or cycloalkylidene radical with 5–15 carbon atoms, an ether bond or a keto bond,
and which have an average degree of polymerisation $\bar{P}$ of at least 30, relative to identical or non-identical structural units of the formula 1, which comprises the reaction of (a) alkali metal salts of bisphenols of the formula 3

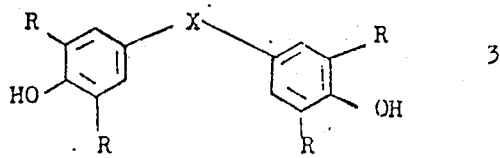
3 wherein R and X are as defined above, with phosgene and/or (b) bischlorocarbonic acid esters of bisphenols of the formula 3 and/or (C) oligomeric carbonates of bisphenols of the formula 3, which optionally have chlorocarbonic acid ester endgroups, in a mixture of an aqueous phase and an inert organic solvent, the process being characterised in that the reaction to give high molecular weight polycarbonates is initiated by adding 10–200 mol per cent relative to the bisphenols employed, of aliphatic tertiary amine, and in that a reaction time of from 5 hours to 0.1 hours is observed.

The subject of the invention is moreover especially a process for the production of high molecular weight polycarbonates comprising only as bifunctional structural units those of the formula 2

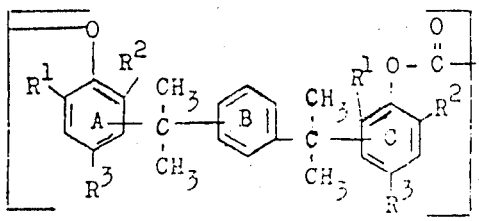

wherein:
$R^1 = CH_3$, $C_2H_5$ or $CH(CH_3)_2$,
$R^2 = CH_3$, $C_2H_5$ or $CH(CH_3)_2$ and
$R^3 = CH_3$, $C_2H_5$ or $CH(CH_3)_2$, the substituent $R^1$ is absent if the bond of the aromatic ring B to the aromatic rings A and C is in the ortho-position in the aromatic rings A and C relative to the carbonate groups in A and C, and the substituent $R^3$ is absent if the bond of the aromatic ring B to the aromatic rings A and C is in the para-position in the aromatic rings A and C relative to the carbonate groups in A and C and which have an average degree of polymerisation $\bar{P}$ of at least 30, relative to identical or non-identical structural units of the formula 2 which comprises the reaction of (a) alkali metal salts of bisphenols of the formula 4

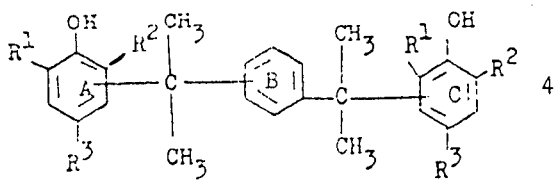

wherein $R^1$, $R^2$ and $R^3$ are as defined above
with phosgene and/or (b) bischlorocarbonic acid esters of bisphenols of the formula 4 and/or (c) oligomeric carbonates of bisphenols of the formula 4 which optionally have chlorocarbonic acid ester end-groups, in a mixture of an aqueous phase and an inert organic solvent, the process being characterised in that the reaction to give high molecular weight polycarbonates is initiated by adding 10–200 mol per cent relative to the bisphenols employed, of aliphatic tertiary amine, and in that a reaction time of from 5 hours to 0.1 hours is observed.

The polycondensation of the reaction products, which are initially produced in situ, in the presence of such high amine concentrations to give high molecular polycarbonates, with quantitative conversion of the bisphenols which are tetraalkylated in the o-position, was not to be expected. This is because, for example, in the analogous reaction of bisphenol A (2,2-bis-(4-hydroxyphenyl)-propane) or α,α'-bis-(4-hydroxyphenyl)-p-diisopropylbenzene with phosgene small amounts of amine, for example 0.25–0.5 mol per cent of triethylamine, already suffice in order to produce high molecular polycarbonates in a short time (5–15 minutes). On the other hand, at a higher amine concentration, say 2–5 mol per cent of triethylamine, high molecular polycarbonates are also still obtained, but here the conversion of bisphenol A or α,α'-bis-(4-hydroxyphenyl)-p-diisopropylbenzene is greatly reduced, so that as the amount of amine increases, increasing proportions of bisphenol remain in the aqueous alkaline phase.

Equally, as emerges from German Auslegeschrift (German Published Specification) 1,190,185 (page 1), amine concentrations of more than 1.0 mol%, relative to the bisphenol present, are of disadvantage to the formation of polycarbonate if phenol or substituted phenols are used as chain stoppers.

Suitable bisphenols of the formula 3 are those having e.g. for X the —$CH_2$—, —$CH_2$—$CH_2$—,

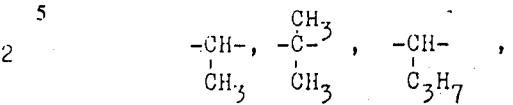

—$CH_2$—$CH_2$—$CH_2$—$CH_2$—,

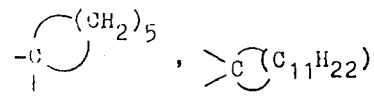

groups, and for R those mentioned above.

The following bisphenols of the formula 3, for example, are suitable for the manufacture of the polycarbonates according to the invention: bis-(3,5-dimethyl-4-hydroxyphenyl)-methane, bis-(3,5-diisopropyl-4-hydroxyphenyl)-methane, 2,2-bis-(3-methyl-5-isopropyl-4-hydroxyphenyl)-propane, 2,2-bis-(3,5-dimethyl-4-hydroxyphenyl)-propane, 2,2-bis-(3,5-diethyl-4-hydroxyphenyl)-propane, 3,3-bis-(3,5-dimethyl-4-hydroxyphenyl)-pentane, 1,1-bis-(3,5-dimethyl-4-hydroxyphenyl)-cyclohexane, 1,4-bis-(3,5-dimethyl-4-hydroxyphenyl)-cyclohexane, bis-(3,5-dimethyl-4-hydroxyphenyl)-ether, bis(3,5-dimethyl-4-hydroxyphenyl) and bis-(3,5-dimethyl-4-hydroxyphenyl)-carbonyl.

Suitable bisphenols of the formula 4 are, for example, α,α'-bis-(4-hydroxy-3,5-dimethylphenyl)-p-diisopropylbenzene, α,α'-bis-(4-hydroxy-3,5-diethylphenyl)-p-diisopropylbenzene, α,α'-bis-(4-hydroxy-3,5-diisopropylphenyl)-p-diisopropylbenzene, α,α'-bis-(4-hydroxy-3-methyl-5-isopropyl-phenyl)-p-diisopropylbenzene, α,α'-bis-(2-hydroxy-3,5-dimethylphenyl)-p-diisopropylbenzene, α,α'-bis-(4-hydroxy-3,5-dimethylphenyl)-m-diisopropylbenzene, α,α'-bis-(4-hydroxy-3,5-diethylphenyl)-m-diisopropylbenzene, α,α'-bis-(4-hydroxy-3,5-diisopropylphenyl)-m-diisopropylbenzene, α,α'-bis-(4-hydroxy-3-methyl-5-isopropyl-phenyl)-m-diisopropylbenzene and α,α'-bis-(2-hydroxy-3,5-dimethylphenyl)-m-diisopropylbenzene.

These new α,α'-bis-(hydroxy-dialkyl-phenyl)-diisopropylbenzenes were manufactured in accordance with the instruction given in Examples 7–10.

Suitable chain stoppers are phenol or substituted phenols, such as 2,6-dimethylphenol or p-tert-butylphenol.

As already mentioned it is surprising that to manufacture high molecular polycarbonates from bisphenols which are peralkylated in the ortho-position to the phenolic hydroxyl groups special process conditions are necessary in order to arrive, in good yields, at high molecular products of average degree of polymerisation of above 30, preferably of above 55, and these conditions not only deviate greatly from the previous practice of polycarbonate manufacture, but are also not suggested by the latter. The process according to the invention thus even allows the bisphenols of the formulae 3 and/or 4 to be condensed to give polycarbonates possessing molecular weights of above 200,000.

The bischlorocarbonic acid esters of the above-mentioned bisphenols of the formulae 3 and 4 can be prepared according to processes which are in themselves known, for example in accordance with the instruction of Example 15.

Oligomeric carbonates with predominantly chlorocarbonic acid ester end groups can also be obtained from the bisphenols of the formulae 3 and 4. If these are manufactured by the two-phase interface process, they can also be polycondensed in situ, without isolation, in accordance with the invention, by adding the catalytically active amount of tertiary amine, to give the desired high molecular polycarbonates.

The process for the manufacture of the homopolycarbonates and copolycarbonates according to the invention can hence be carried out either in one step or in several steps.

For example, as is in itself known, the bisphenols are dissolved in aqueous alkali, preferably in sodium hydroxide solution or potassium hydroxide solution, and a suitable solvent for the polycarbonate being produced is added. Suitable solvents of this nature are generally chlorinated hydrocarbons, such as methylene chloride, chloroform and 1,2-dichloroethane, but also chlorinated aromatics, such as chlorobenzene, dichlorobenzene and chlorotoluene. Phosgene is passed into this mixture with vigorous stirring. In the case of bisphenols which, because of their hydrophobic character, do not produce bisphenolate solutions, a suspension is advantageously employed. The amount of phosgene required depends on the bisphenol employed, the stirring action and the reaction temperature, which can lie between about 10° and about 60°C, and is in general 1.1–3.0 mols of phosgene per mol of bisphenol. After the phosgenation, which can also already be carried out in the presence of chain stoppers, for example 2,6-dimethylphenol, the condensation to give a high molecular polycarbonate is carried out by adding aliphatic tertiary amine, for example trimethylamine triethylamine, dimethylbenzylamine or triethylenediamine, as the catalyst. The amounts of amine are in general 10–200 mol per cent, relative to bisphenol, but preferably 10–50 mol per cent are employed; a reaction time of about 5 to about 1.5 hours is in general sufficient. The polycarbonates thus manufactured can be isolated according to known processes, for example by separating off the aqueous phase, repeatedly washing the organic phase with water until it is free of electrolyte, and thereafter precipitating the polycarbonate or evaporating off the solvent. The polycarbonates thus obtained contain no saponifiable chlorine constituents.

The high molecular polycarbonates manufactured according to the process of the invention represent excellent thermoplastics, and lend themselves well to processing into mouldings, films, fibres, bristles, sheets and coatings. They can also be used successfully in mixtures with fillers, for example minerals, carbon black and glass fibres, and in mixtures with pigments, dyestuffs, UV-absorbers and other additives. The polycarbonates according to the invention generally possess glass transition temperatures of at least 140°C, and not infrequently even of above 180°C. They are furthermore extremely stable to hydrolysis, saponification and aminolysis. They can be employed of course wherever the polycarbonates known in the art are employed, moreover in particular, with great advantage when high heat resistance and high resistance to hydrolysis, saponification and aminolysis matters. Thus they can, for example, serve for the manufacture of pipelines for hot alkaline or acid solutions, of high quality seals, of crockery, of instruments which can be sterilised by hot steam, and of films for the packaging of foodstuffs. As a result of the good solubility in solvents, such as toluene and xylene, they can also be used as lacquers, for example for the coating of plastics.

The properties of the polycarbonates according to the invention can be modified by the incorporation of additional bisphenols or aliphatic dihydroxy compounds into the polycarbonates.

The process described for the bisphenols of the formula 4 also permits the manufacture of bisphenols of the formula 5 (compare Examples 11–14)

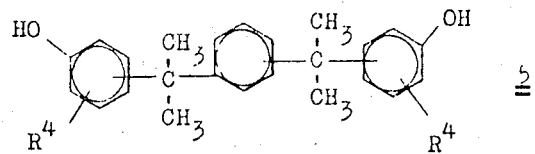

wherein:
$R^4$ represents substituents, for example alkyl, phenyl and halogen substituents.

These bisphenols are also excellently suited to being used as comonomers, in the sense described above, for the modification of the new high molecular homopolycarbonates and copolycarbonates which can be manufactured in accordance with the process of the invention.

The bisphenols of the type of the formula 5 can of course also be condensed according to conventional methods to give high molecular polycarbonates (compare Example 19 and 20) having improved saponification resistance, and better solubility in a series of organic solvents, as compared to polycarbonates from bisphenols which are unsubstituted in the ortho-position relative to the phenolic OH groups.

The invention is further illustrated but is not intended to be limited by the following examples in which all parts and percentages are by weight unless otherwise specified.

EXAMPLE 1

Manufacture of high molecular polycarbonate from the bischlorocarbonic acid ester of 2,2-bis-(3,5-dimethyl-4-hydroxyphenyl)-propane.

41.6 g of sodium hydroxide (1.04 mols) are dissolved in 600 ml of water. 100 ml of methylene chloride and 2.8 ml of triethylamine (0.02 mol) are added, whilst stirring well. 81.8 g of bischlorocarbonic acid ester of 2,2-bis-(3,5-dimethyl-4-hydroxyphenyl)-propane (0.2 mol), dissolved in 500 ml of methylene chloride, are then added all at once, whilst continuing to stir well. The mixture is vigorously stirred for a further 2¾ hours. The experiment is carried out under nitrogen; the reaction temperature is 20°–25°C. After the subsequent stirring the batch is worked up. The aqueous phase is free of bisphenol. The organic phase is diluted with 1000 ml of methylene chloride and is then washed twice with 1000 ml of 5% strength aqueous hydrochloric acid and thereafter with water until free of electrolyte. After concentrating the organic phase to 600 ml and treating it with acetone until it begins to turn cloudy, the organic phase is added dropwise to 2500 ml of methanol, whereupon the polycarbonate precipitates. It is dried. The yield of flocculent, white polycarbonate is 60 g. The relative viscosity of the polycarbonate is 2.070 (in methylene chloride at 25°C, c = 5 g/l). The average molecular weight from light scattering measurements, $M_{LS}$, is 186,000. Colourless, clear, tough films can be drawn from the methylene chloride solution of the polymer. The glass transition temperature of the polymer (differential thermal analysis) is 210°C. Measurements on films show the following:
tensile strength $\sigma_R$ = 698 kp/cm$^2$
elongation at break: $\epsilon_R$ = 89%
E-modulus from tensile test = 20,600 kp/cm$^2$
dielectric loss factor tan (DIN 53,483) = 1 × 10$^{-3}$ at 10$^6$ Hz.

EXAMPLE 2

Manufacture of high molecular polycarbonate from 2,2-bis-(3,5-dimethyl-4-hydroxyphenyl)-propane and its bis-chlorocarbonic acid ester.

22.4 g of sodium hydroxide (0.56 mol) and 22.7 g of 2,2-bis-(3,5-dimethyl-4-hydroxyphenyl)-propane (0.08 mol) are dissolved in 600 ml of water. 100 ml of methylene chloride and 3.0 ml of triethylamine (0.02 mol) are then added whilst stirring. 49.1 g of the bischlorocarbonic acid ester of 2,2-bis-(3,5-dimethyl-4-hydroxyphenyl)-propane (0.12 mol), dissolved in 500 ml of methylene chloride, are added all at once to this mixture, whilst stirring vigorously. The mixture is then vigorously stirred for a further 2½ hours. The process is carried out under nitrogen at 20°–25°C. The batch is worked up as in Example 1. The aqueous phase is free of bisphenol. 59 g of a white flocculent polycarbonate are obtained, the methylene chloride solution of which yields a clear, strong, tough film. The relative viscosity of the polymer is 1.529 (in methylene chloride at 25°C, c = 5 g/l), the average molecular weight from light scattering measurements, $M_{LS}$ is 83,000, and the glass transition temperature is 206°C.

EXAMPLE 3

Manufacture of high molecular polycarbonate from 2,2-bis-(3,5-dimethyl-4-hydroxyphenyl)-propane and phosgene, with 2,6-dimethylphenol as the chain stopper.

28.0 g of sodium hydroxide (0.7 mol), 56.8 g of 2,2-bis-(3,5-dimethyl-4-hydroxyphenyl)-propane (0.2 mol) and 0.733 g of 2,6-dimethylphenol (0.006 mol) are dissolved in 600 ml of water. 600 ml of methylene chloride are then added whilst stirring. 40 g of phosgene (0.4 mol) in the gaseous form are then passed into the reaction mixture, with vigorous stirring. The pH value of the aqueous phase is kept at 13 by addition of sodium hydroxide. 64 ml of a sodium hydroxide solution containing 32 g of sodium hydroxide (0.8 mol), and a further 3 ml of triethylamine (0.2 mol), are then added. The mixture is then vigorously stirred for a further 2½ hours. The entire reaction is carried out under nitrogen at 20°–25°C. The reaction mixture is worked up as under Example 1. The aqueous phase is free of bisphenol. A white, flocculent polycarbonate is obtained. Yield 60 g $\eta_{rel}$ = 1.284 (in methylene chloride at 25°C, c = 5 g/l). The average molecular weight from light scattering measurements, $M_{LS}$, is 35,000. A methylene chloride solution yields a clear, tough, colourless film. Glass transition temperature = 201°C.

EXAMPLE 4

Manufacture of high molecular polycarbonate from bis-(3,5-dimethyl-4-hydroxyphenyl)-methane and phosgene.

14.0 g of sodium hydroxide (0.35 mol) are dissolved in 300 ml of water, and 300 ml of methylene chloride and 25.6 g of bis-(3,5-dimethyl-4-hydroxyphenyl)-methane (0.1 mol) are then added whilst stirring. 20 g of phosgene (0.2 mol) in the gaseous form are then introduced, with vigorous stirring. The pH value is kept at 13 by adding sodium hydroxide. 16 g of sodium hydroxide (0.4 mol) in 32 ml of aqueous solution, and 1.5 ml of triethylamine (0.01 mol) are then added, and the mixture is vigorously stirred for a further 3¼ hours. The entire reaction is carried out under nitrogen and at 20°–25°C.

The batch is worked up as in Example 1. The aqueous phase is free of bisphenol. A flocculent, white polycarbonate is obtained. Yield 26.5 g. $\eta_{rel}$ = 1.433 (in methylene chloride at 25°, c = 5 g/l). Glass transition temperature 201°C (differential thermal analysis). A clear, colourless film can be drawn from the methylene chloride solution.

EXAMPLE 5

Manufacture of high molecular polycarbonate from bis-(3,5-dimethyl-4-hydroxyphenyl)-methane and the bischlorocarbonic acid ester of 2,2-bis-(3,5-dimethyl-4-hydroxyphenyl)-propane.

24 g of sodium hydroxide (0.60 mol) and 15.7 g of bis-(3,5-dimethyl-4-hydroxyphenyl)-methane (0.06 mol) are dissolved in 600 ml of water. 100 ml of methylene chloride and 3.0 ml of triethylamine (0.02 mol) are then added whilst stirring. 57.3 g of bischlorocarbonic acid ester of 2,2-bis-(3,5-dimethyl-4-hydroxyphenyl)-propane (0.14 mol), dissolved in 500 ml of methylene chloride, are added all at once to this mixture, with vigorous stirring. The mixture is then vigorously stirred for a further 3 hours. The process is carried out under nitrogen and at 20°–25°C. The batch is worked up as in Example 1. The aqueous phase is free of bis-phenol. Yield: 57 g of white, flocculent polycarbonate, from the methylene chloride solution of which colourless, clear, tough films can be drawn. $\eta_{rel}$ = 1.513 (in methylene chloride at 25°C, c = 5 g/l). The product shows a glass transition temperature of 202°C (differential thermal analysis).

EXAMPLE 6

Manufacture of high molecular polycarbonate from 1,1-bis-(3,5-dimethyl-4-hydroxyphenyl)-cyclohexane and phosgene.

8 g of NaOH were dissolved in 175 ml of $H_2O$. 175 ml of $CH_2Cl_2$ were added thereto. 16.2 g (0.05 mol) of 1,1-bis-(3,5-dimethyl-4-hydroxyphenyl)-cyclohexane were then dissolved in this mixture, whilst stirring well. 14 g (0.14 mol) of $COCl_2$ were passed in, whilst continuing to stir vigorously. After the addition of 0.7 ml (0.005 mol) of triethylamine, the mixture was stirred for a further 1½ hours, a further 6 g (0.06 mol) of phosgene were then passed in, and the mixture was stirred for a further 2½ hours. Whilst passing in $COCl_2$ and whilst stirring subsequently, the pH of the aqueous phase was kept at 13 by dropwise addition of 50% strength NaOH. The entire experiment was carried out under $N_2$ and at 20°–25°C. The batch was worked up as in Example 1. Yield: 17 g of white, flocculent polycarbonate ( =97% of theory). $\eta_{rel}$ = 1.294, glass transition temperature (differential thermal analysis) = 213°C, molecular weight from light scattering $\overline{M}w$ =

59,700. A CH₂Cl₂ solution of the polymer gave a clear, colourless film.

Table 1

Examples of the resistance of the polycarbonates according to the invention to 10% strength aqueous sodium hydroxide at 100°C.

Decrease in weight of pieces of film, 4 × 5 cm, approx. 70–100 μm thick, weight 150–200 mg. The pieces of film are washed with water, and dried, before being weighed.

| Treatment | Weight decrease in mg of the polycarbonates | | | | | |
|---|---|---|---|---|---|---|
| time [hrs] | from Bisphenol A | from Ex. 1 | from Ex. 2 | from Ex. 3 | from Ex. 4 | from Ex. 5 |
| 1000 | completely dissolved | 0 | 0 | 0 | 0 | 0 |

Table 2

Examples of the resistance of the polycarbonates according to the invention to 10% strength aqueous hydrochloric acid at 100°C.

Pieces of film 70–100 μm thick
u = unchanged, clear and tough

| Treatment | Properties of the films of polycarbonates | | | | | |
|---|---|---|---|---|---|---|
| time [hrs] | from Bisphenol A | from Ex. 1 | from Ex. 2 | from Ex. 3 | from Ex. 4 | from Ex. 5 |
| 1000 | disintegrated | u | u | u | u | u |

Table 3

Examples of the resistance of the polycarbonates according to the invention to concentrated aqueous ammonia solution at 25°C.

Pieces of film 70–100 μm thick
u = unnchanged, clear and tough

| Treatment | Properties of the films of polycarbonates | | | | | |
|---|---|---|---|---|---|---|
| time [hrs] | from Bisphenol A | from Ex. 1 | from Ex. 2 | from Ex. 3 | from Ex. 4 | from Ex. 5 |
| 250 | completely dissolved | u | u | u | u | u |

EXAMPLES 7–14

The examples which follow are concerned with the manufacture of α,α'-bis-( hydroxyphenyl)-diisopropylbenzenes which are substituted in the o-position relative to the hydroxyl groups.

Method A 1 mol of α,α'-dihydroxy--diisopropylbenzene is dissolved in 5–6 mols of the 2-substituted or of the 2,4- or 2,6-di-substituted phenol. This solution is added dropwise to 5–6 mols of the same phenol saturated with hydrochloric acid gas, over the course of 1–2 hours at 40°–60°C, whilst stirring and passing in hydrochloric acid. After a further 1–2 hours the hydrochloric acid, water and excess phenol are distilled off as far as possible in vacuo, and the residue is recrystallised once or twice, depending on the contamination, from a suitable solvent.

Method B

Initially, the procedure under A is followed, including the removal of the excess phenol by distillation. Then, however, the residue is fractionated in a high vacuum and the fraction boiling above 200°–220° is recrystallised from a suitable solvent.

The bisphenols obtained according to method A or B are colourless, crystalline substances, the structure of which has been confirmed analytically. The table which follows contains bisphenols manufactured according to the above methods, and to characterise these bisphenols the melting point and hydroxyl number, or percentage by weight of phenolic hydroxyl, are quoted.

Table 4

α,α'-Bis-(hydroxyphenyl)-diisopropylbenzenes, substituted in the o-position to the OH groups and manufactured as described above.

| Example | Designation | Melting point. °C | Analysis | Method |
|---|---|---|---|---|
| 7 | α,α'-Bis-(4-hydroxy-3,5-dimethyl-phenyl)-p-diisopropylbenzene | 157–9° | phenolic OH found: 8.4–8.7 % by weight calculated: 8.5 % by weight | A |
| 8 | α,α'-Bis-(4-hydroxy-3,5-diethyl-phenyl)-p-diisopropylbenzene | 103–5° | OH-number found: 243–246 calculated: 245 | B |
| 9 | α,α'-Bis-(4-hydroxy-3,5-diisopropyl-phenyl)-p-diisopropylbenzene | 105–7° | OH-number found: 214–221 calculated: 219 | B |
| 10 | α,α'-Bis-(2-hydroxy-3,5-dimethyl-phenyl)-p-diisopropylbenzene | 179–180° | phenolic OH found: 8.6–9.0 % by weight calculated: 8.5 % by weight | A |
| 11 | α,α'-Bis-(4-hydroxy-3-isopropyl-phenyl)-p-diisopropylbenzene | 134–6° | OH-number found: 268 calculated: 262 | A |
| 12 | α,α'-Bis-(4-hydroxy-3-tert.-butyl-phenyl)-p-diisopropylbenzene | 166–7° | OH-number found: 237–241 calculated: 245 | A |
| 13 | α,α'-Bis-(4-hydroxy-3-isobutyl-phenyl)-p-diisopropylbenzene | 104–5° | OH-number found: 242–247 calculated: 245 | B |

Table 4 -Continued

α,α'-Bis-(hydroxyphenyl)-diisopropylbenzenes, substituted in the o-position to the OH groups and manufactured as described above.

| Example | Designation | Melting point. °C | Analysis | Method |
|---|---|---|---|---|
| 14 | α,α'-Bis-(4-hydroxy-3-phenyl-phenyl)-p-diisopropylbenzene | 135–7° | OH-number found: 231–4 calculated: 225 | A |
| 7a | α,α'-Bis-(3,5-dimethyl-4-hydroxy-phenyl)-m-diisopropylbenzene | 132–134 | phenolic OH found: 8.3–8.7 % by weight calculated: 8.5 % by weight | B |

EXAMPLE 15

Preparation of the Bischlorocarbonic Acid Ester of α,α'-Bis-(4-Hydroxy-3,5-Dimethylphenyl)-P-Diisopropylbenzene 100.5 g of α,α'-bis-(4-hydroxy-3,5-dimethylphenyl)-p-diisopropylbenzene (0.25 mol) were suspended in 450 ml of toluene. 74.2 g of phosgene (0.75 mol) were passed into this suspension at −5° to 0°C. 61.8 g of N,N-dimethylaniline (0.51 mol) dissolved in 50 ml of toluene were then added dropwise at 0°–25°C, whilst stirring. After adding 100 ml of toluene, the batch was heated to 80°C over the course of 2 hours, whilst stirring. Excess phosgene and 100 ml of toluene were then stripped off. After standing for 15 hours, the batch was treated with 800 ml of methylene chloride. The clear, fluid solution was washed 3 times with 500 ml of 5% strength hydrochloric acid and then with water until free of electrolyte. The toluene and the methylene chloride were then stripped off. After drying, 125 g of white crystals of melting point 156°–158°C were obtained (95% of theory). Analysis showed 13.4% of chlorine (theory: 13.45% of chlorine).

EXAMPLE 16

Polycarbonate from the Bischlorocarbonic Acid Ester of α,α'-Bis-(4-Hydroxy-3,5-Dimethylphenyl)-P-Diisopropylbenzene 20.9 g of sodium hydroxide (0.52 mol) were dissolved in 300 ml of water. 1.01 g of triethylamine (0.01 mol) were added thereto. A solution of 52.7 g of bischlorocarbonic acid ester of α,α'-bis-(4-hydroxy-3,5-dimethylphenyl)-p-diisopropylbenzene (0.1 mol) in 300 ml of methylene chloride was then added all at once, whilst stirring well, and the mixture was afterwards vigorously stirred for a further 2½ hours. During the entire experiment the reaction mixture was kept at 20°–25° C and under nitrogen. The aqueous phase was free of bisphenol. The organic phase was diluted with 600 ml of methylene chloride and washed three times with 300 ml of 5 per cent strength hydrochloric acid and then with water until free of electrolyte. The solution was then concentrated to 300 ml and the polymer was precipitated therefrom by dropwise addition to 4 l of methanol, and was subsequently dried. Yield: 41 g (= 96% of theory) of white, flocculent polycarbonate. $\eta_{rel} = 1.647$ (in methylene chloride at 25°C, c = 5 g/l), limiting viscosity $[\eta] = 108$, molecular weight $\overline{M}_w$ (light scattering) = 171,000. A colourless, clear, tough film was obtained from the methylene chloride solution.

Properties of the polycarbonate, measured on the film:

Tensile strength $\sigma_R = 650$ kp/cm$^2$

Elongation at break $\epsilon_R = 174\%$

E-modulus from tensile test = 26,000 kp/cm$^2$

Glass transition temperature (differential thermal analysis) = 201°C

EXAMPLE 17

Polycarbonate From α,α'-Bis-(4-Hydroxy-3,5-Dimethylphenyl)-P-Diisopropylbenzene and phosgene 50.4 g of sodium hydroxide were dissolved in 600 ml of water. 600 ml of methylene chloride are added thereto. 80.4 g of α,α'-bis-(4-hydroxy-3,5-dimethylphenyl)-p-diisopropylbenzene (0.2 mol) were added whilst stirring well. The resulting sodium salt of the bisphenol was sparingly soluble in water and a suspension was formed. Phosgene was passed in, with vigorous stirring, until the aqueous phase was free of bisphenol. The pH-value of the aqueous phase was kept at 13 by adding sodium hydroxide. 2.02 g of triethylamine (0.02 mol) and 64 ml of aqueous sodium hydroxide (containing 32 g of sodium hydroxide) were then added and the mixture was vigorously stirred for a further 3 hours. During the entire experiment, the material was kept under nitrogen and the temperature was kept at 20°–25°C. Working-up took place analogously to Example 16. Yield: 82 g (= 95% of theory) of white, flocculent polycarbonate, $\eta_{rel} = 1.617$, limiting viscosity $[\eta] = 103$, molecular weight $\overline{M}_w$ (light scattering) = 166,000. A clear, colourless, tough, film was obtained from a methylene chloride solution of the polymer.

EXAMPLE 18

Copolycarbonate from the Bischlorocarbonic Acid Ester of α,α'-Bis-(4-Hydroxy-3,5-Dimethylphenyl)-P-Diisopropylbenzene and from Bisphenol A 12.8 g of sodium hydroxide (0.32 mol) and 4.56 g of Bisphenol A (0.02 mol) were dissolved in 300 ml of water. 100 ml of methylene chloride and 0.81 g of triethylamine (0.008 mol) were then added. 31.7 g of bischlorocarbonic acid ester of α,α'-bis-(3,5-dimethyl-4-hydroxyphenyl)-p-diisopropylbenzene (0.06 mol), dissolved in 200 ml of methylene chloride, were then added all at once, with vigorous stirring. Stirring was continued for 3 hours. The reaction temperature was kept at 20°–25°C and the process was carried out under nitrogen. The aqueous phase was free of bisphenol. The working-up of the batch took place analogously to Example 7. Yield: 30 g (= 97% of theory) of a white, flocculent copolycarbonate, $\eta_{rel} = 1.530$ (100 ml of methylene chloride solution at 25°C). Film from methylene chloride solution: clear, colourless, tough, glass transition temperature (differential thermal analysis) = 188°C.

EXAMPLE 19

Polycarbonate from α,α'-Bis-(4-Hydroxy-3-Isopropylphenyl)-P-Diisopropylbenzene 20.4 g (0.51 mol) of sodium hydroxide were dissolved in 260 ml of water, 21.5 g (0.05 mol) of α,α'-bis-(4-hydroxy-3-isopropylphenyl)-p-diisopropylbenzene and 260 ml of methylene chloride were added thereto, whilst stirring well. 9.9 g (0.1 mol) of phosgene were then passed into the reaction mixture, whilst stirring well. After the introduction of the phosgene, 0.101 g (0.001 mol) of triethylamine, dissolved in 2 ml of water, was added and the mixture was vigorously stirred for a further 90 minutes. The entire reaction was carried out under nitrogen at 20°–25°C. Following the final stirring, the phases were separated. The aqueous phase was free of bisphenol. The organic phase was washed 3 times with 400 ml of dilute hydrochloric acid solution and then with water until the wash water was free of electrolyte. It was then added dropwise to 8 l of methanol. The polymer which precipitated was dried. 22 g (= 96% of theory) of white, flocculent polycarbonate of $\eta_{rel}$ = 1.969 (0.5 g/100 ml of methylene chloride at 25°C and a glass transition temperature of 102°C (differential thermal analysis) were obtained; it was possible to draw a colourless, clear film from the solution of the polycarbonate in methylene chloride.

EXAMPLE 20

Polycarbonate from α,α'-Bis-(4-Hydroxy-3-Phenyl-Phenyl)-P-Diisopropylbenzene 20.4 g (0.51 mol) of sodium hydroxide were dissolved in 260 ml of water. 24.9 (0.05 mol) of α,α'-bis-(4-hydroxy-3-phenylphenyl)-p-diisopropylbenzene and 260 ml of methylene chloride were added thereto, whilst stirring well. 9.9 g (0.1 mol) of phosgene were then passed into the reaction mixture whilst stirring well. After the introduction of the phosgene, 0.101 g (0.001 mol) of triethylamine, dissolved in 2 ml of water, was added and the mixture was vigorously stirred for a further 30 minutes. The entire reaction was carried out under nitrogen at 20°–25°C. Following the final stirring, the phases were separated. The aqueous phase was free of bisphenol. The organic phase was washed 3 times with 400 ml of dilute hydrochloric acid solution and then with water until the wash water was free of electrolyte. It was then added dropwise to 8 l of methanol. The polymer which precipitated was dried. 25 g (= 95% of theory) of white, flocculent polycarbonate of $\eta_{rel}$ = 1.918 (0.5 g/100 ml of methylene chloride at 25°C) and a glass transition temperature of 147°C (differential thermal analysis) were obtained; it was possible to draw a colourless, clear film from the solution of the polycarbonate in methylene chloride.

Table 5

Examples of the stability to 10% strength aqueous sodium hydroxide, at 100°C, of the polycarbonates manufactured according to the process of the invention.

Decrease in weight of pieces of film of size 4 × 5 cm, approx. 70–100 μm thick, weighing 150–200 mg. Before each weighing, the pieces of film were washed with water and dried.

| Treatment time | Decrease in weight in mg | | |
|---|---|---|---|
| [hrs] | Polycarbonate from Bisphenol A | from Example 16 | from Example 17 |
| 1000 | completely dissolved | .0 | 0 |

Table 6

Examples of the stability to 10% strength aqueous hydrochloric acid, at 100°C of the polycarbonates manufactured according to the process of the invention.
Pieces of film 70–100 μm thick
b = very brittle, breaks extremely easily
μ = unchanged, clear and tough

| Treatment time | Properties of the films | | |
|---|---|---|---|
| [hrs] | Polycarbonate from Bisphenol A | from Example 16 | from Example 17 |
| 1000 | b | μ | μ |

Table 7

Examples of the stability to concentrated aqueous ammonia solution at 25°C, of the polycarbonate manufactured according to the process of the invention.
Pieces of film 70–100 μm thick
u = unchanged, clear and tough.

| Treatment time | Properties of the films | | |
|---|---|---|---|
| [hrs] | Polycarbonate from Bisphenol A | from Example 16 | from Example 17 |
| 250 | completely dissolved | μ | μ |

EXAMPLE 21

Polycarbonate from α,α'-Bis-(4-Hydroxy-3,5-Dimethylphenyl)-M-Diisopropylbenzene and Phosgene 24.8 g (0.62 mol) of NaOH were dissolved in 210 ml of $H_2O$. 210 ml of $CH_2Cl_2$ and 20.1 g (0.05 mol) of α,α'-bis-hydroxy-3,5-dimethyl-phenyl)-m-diisopropylbenzene were added to this solution, whilst stirring well. 14.8 g (0.15 mol) of phosgene were passed into this mixture, with vigorous stirring, and thereafter 8 g of NaOH, dissolved in 10 ml of $H_2O$, and 0.7 ml (0.005 mol) of triethylamine were added. The mixture was stirred for a further hour, 4.9 g. (0.05 mol) of $COCl_2$ were further passed in, whilst stirring, and the mixture was stirred for a further 2 hours thereafter. During the entire experiment, the substances were kept under $N_2$ and the temperature was kept at 20°–25°C. The batch was worked up analogously to Example 16; the aqueous phase was free of bisphenol.

Yield: 21 g of white, flocculent polycarbonate (98% of theory), $\alpha_{rel} = 1.468$, limiting viscosity $[\eta] = 81$, molecular weight $\overline{M}_w$ (light scattering) = 110,100, glass transition temperature (differential thermal analysis) = 142°C. A clear, tough film was obtained from a $CH_2Cl_2$ solution of the polymer.

EXAMPLE 22

Copolycarbonate from the Bischlorocarbonic Acid Esters of
$\alpha,\alpha'$-Bis-(3,5-Dimethyl-4-Hydroxyphenyl)-P-Diisopropylbenzene and
2,2-Bis-(3,5-Dimethyl-4-Hydroxyphenyl)-Propane 22.4 g (0.56 mol) of NaOH and 1.4 ml (0.01 mol) of triethylamine were dissolved in 400 ml of $H_2O$. A solution 400 ml of $CH_2Cl_2$, 36.9 g (0.07 mol) of bischlorocarbonic acid ester of $\alpha,\alpha'$-bis-(3,5-dimethyl-4-hydroxyphenyl)-p-diisopropylbenzene and 12.3 g (0.03 mol) of bischlorocarbonic acid ester of 2,2-bis-(3,5-dimethyl-4-hydroxyphenyl)-propane was then added all at once whilst stirring well, and the mixture was afterwards stirred vigorously for a further 3 hours. During the entire experiment, the reaction solution was kept at 20°–25°C and under $N_2$. The aqueous phase was free of bisphenol. Working-up took place analogously to Example 16. Yield: 38 g (= 96% of theory) of white, flocculent copolycarbonate; $\eta_{rel} = 1.462$. A colourless, clear, tough film was obtainable from a $CH_2Cl_2$ solution of the polymer.

EXAMPLE 23

Polycarbonate from the bischlorocarbonic acid ester of $\alpha,\alpha'$-bis-
4-hydroxy-3,5-dimethylphenyl)-p-diisopropylbenzene, with 2,6-dimethylphenol as the chain stopper.

20.9 g (0.52 mol) of NaOH, 1.01 g (0.1 mol) of triethylamine and 0.183 g (0.0015 mol) of 2,6-dimethylphenol were dissolved in 300 ml of $H_2O$. A solution of 52.7 g (0.1 mol) of bischlorocarbonic acid ester of $\alpha,\alpha'$-bis-(4-hydroxy-3,5-dimethylphenyl)-p-diisopropylbenzene in 300 ml of $CH_2Cl_2$ was then added all at once, whilst stirring well, and the mixture was thereafter vigorously stirred for a further 2½ hours. During the entire experiment the reaction mixture was kept at 20°–25°C and under $N_2$. The aqueous phase was free of bisphenol. The working-up of the batch took place analogously to Example 16. Yield, 41 g (= 95% of theory) of white, flocculent polycarbonate, $\eta_{rel} = 1.306$. A colourless, clear, tough film was obtained from a $CH_2Cl_2$ solution.

What is claimed is:

1. High molecular weight polycarbonates consisting essentially of bifunctional structural units wherein said bifunctional structural units are those of the formula 1

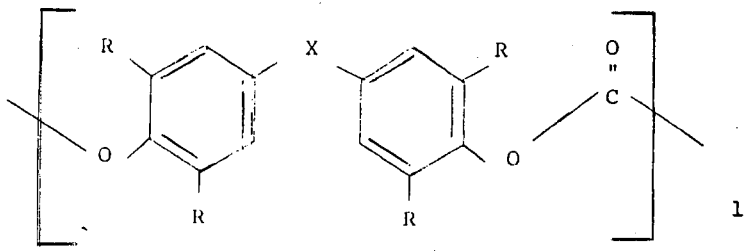

wherein:
R is $CH_3$, $C_2H_5$ or $CH(CH_3)_2$ and
X is a bond, an alkylene or alkylidene group with 1 to 5 carbon atoms, or cyclohexylene or cyclohexylidene radical and having an average degree of polymerization of at least 55.

2. The polycarbonates of claim 1 wherein R is $-CH_3$.

3. The polycarbonates of claim 2 wherein X is a 2,2 substituted propylidene radical.

4. The polycarbonates of claim 2 containing no saponifiable chlorine substituents.

5. The polycarbonates of claim 4 wherein X is a 2,2 substituted propylidene radical.

6. The polycarbonates of claim 1 containing no saponifiable chlorine substituents.

7. The polycarbonates of claim 6 wherein X is a 2,2 substituted propylidene radical.

8. The polycarbonates of claim 1 wherein X is a 2,2 substituted propylidene radical.

9. A process for preparing the polycarbonates of claim 1 comprising reacting (a) alkali metal salts of bisphenols of the formula 3

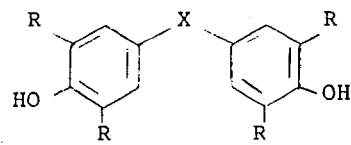

wherein R and X are as defined for the polycarbonates of claim 1, with phosgene and/or (b) bischlorocarbonic acid esters of bisphenols of the formula 3 and/or (c) oligomeric carbonates of bisphenols of the formula 3 which optionally have chlorocarbonic acid ester end groups, in a mixture of an aqueous phase and an inert organic solvent, the process being characterized in that the reaction to give high molecular weight polycarbonates is initiated by adding 10–200 mol per cent relative to the bisphenols employed, of an aliphatic tertiary amine, and in that a reaction time of from 5 hours to 0.1 hours is observed, with the proviso that the product of the amount of amine (mol per cent) and the reaction time (hours) is greater than 15.

10. The process of claim 9 comprising reacting in the presence of a chain stopper.

11. The process of claim 9 wherein the aliphatic tertiary amine is selected from the group consisting of trimethylamine, triethylamine, dimethylbenzylamine, triethyldiamine and the homologs of these amines.

12. The process of claim 9 wherein the aliphatic tertiary amine is triethylamine.

* * * * *